Sept. 29, 1959
L. M. THOMKA
2,906,742
ETHYLENE POLYMERIZATION PROCESS
Filed Dec. 8, 1955
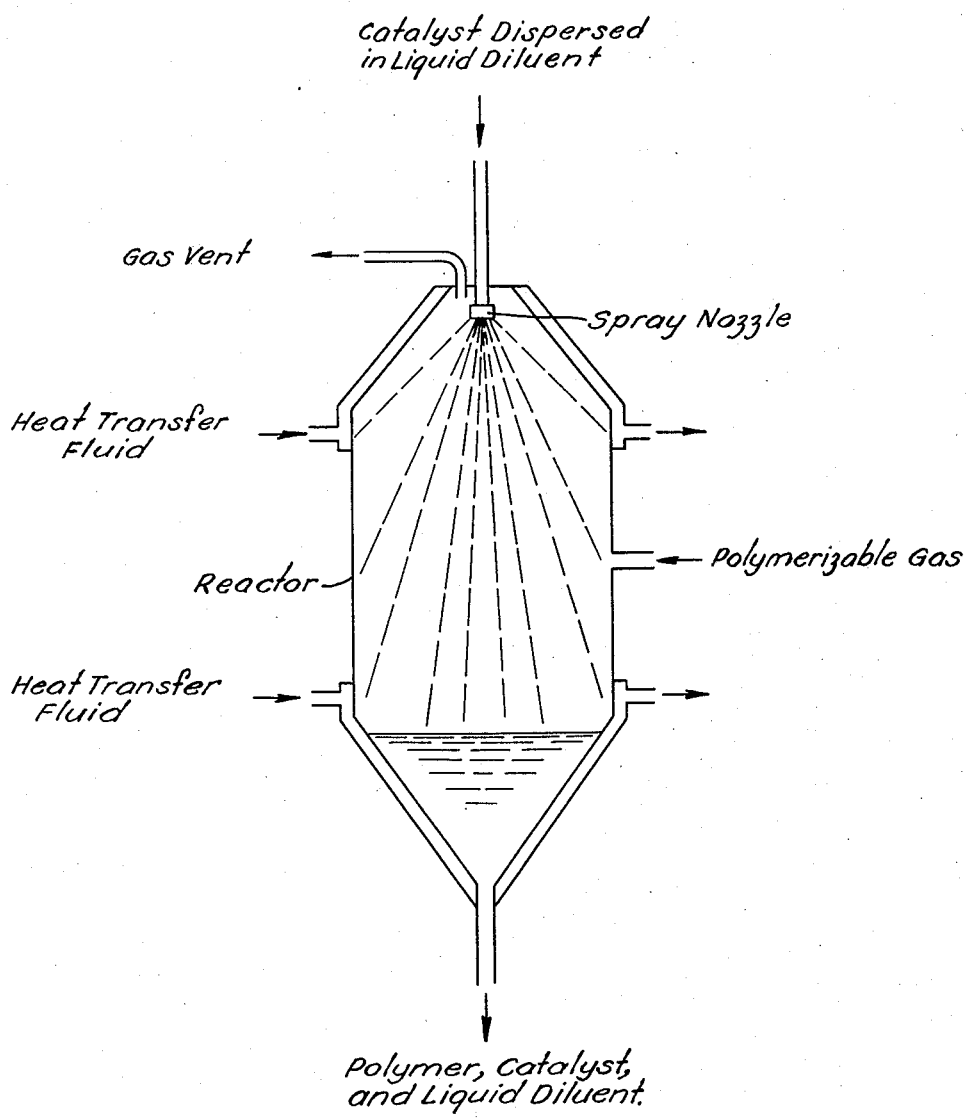
INVENTOR.
Laddie M. Thomka
BY
Griswold & Burdick
ATTORNEYS

2,906,742
ETHYLENE POLYMERIZATION PROCESS

Laddie M. Thomka, Midland, Mich., assignor to The Dow Chemical Company, Midland, Mich., a corporation of Delaware Application December 8, 1955, Serial No. 551,907

10 Claims. (Cl. 260—94.9)

This invention relates to the polymerization of polymerizable organic materials, especially alpha-olefins that are in the gas state at the temperature and pressure of polymerization, such as ethylene, and wherein the polymerization is catalyzed by complex organo-metal catalysts. It particularly pertains to a mode of operation wherein the polymerizable organic material is maintained in the polymerization reaction zone in the form of a body of gas, and a liquid composition comprising the complex organo-metal catalyst and an inert liquid diluent is dispersed as droplets into the body of gas.

Recent developments in the making of polymers such as polyethylene have involved the use of complex organo-metal catalyst, whereby high molecular weight products can be obtained at relatively low pressures, e.g. at pressures below 100 atmospheres, and at relatively low temperatures, e.g. from 50° to 100° C. The solid polymer products thereby obtained have high molecular weights, e.g. from 20,000 to 300,000 or more, softening points in the order of 130° C. and above, and specific gravities in the order of 0.94 and above. The complex organo-metal catalysts that are employed to effect such polymerizations are formed, for example, by admixing a strong reducing agent such as a trialkyl aluminum compound and a compound of a heavier metal of group IX–B, V–B, or VI–B, i.e. metals of the left-hand subgroup of groups IV, V, and VI, of the periodic system of the elements. For example, a complex organo-metal catalyst that is effective in causing ethylene to polymerize to a high molecular weight polymer product is prepared by admixing triisobutyl aluminum and titanium tetrachloride.

It is not known precisely what the catalyst structure is. It is known that a chemical reaction occurs on admixing the moieties, e.g. the trialkyl aluminum compound and the heavier metal compound; heat is evolved, a change of color occurs, and a precipitate sometimes forms. It is also known that the resulting composition is catalytically different from either starting ingredient alone. It has been proposed that the catalytic entity is a lower valence compound or organic complex of the heavier metal. Herein, the term "complex organo-metal catalyst" or, more simply, "catalyst" will be employed as meaning the catalytically active composition, whatever its structure, of a kind prepared in the manner hereinbefore described.

In carrying out the polymerization of polymerizable organic compounds, such as ethylene, that are normally gaseous at the temperature and pressure of the polymerization, according to this prior method, it is customary to employ chemically inert liquids as media. Suitable such liquids, for example, are aliphatic and cycloaliphatic hydrocarbons such as pentane, hexane, cyclohexane, tetrahydronaphthalene, decahydronaphthalene, and liquid paraffins such as petroleum spirits; aromatic hydrocarbons such as benzene, toluene, and xylenes; and halogenated aromatic hydrocarbons such as chlorobenzene and o-dichlorobenzene. Many of these materials are not solvents for the polymeric product of the polymerization.

Usually, the liquid diluent is employed in such proportion that the slurry of solid polymer in such liquid medium can still be stirred at the end of the reaction, e.g., from about 6 to about 15 parts by weight of the liquid medium per part of solid polymer.

In order to contact a gas stream comprising a polymerizable organic compound, such as ethylene, with a complex organo-metal catalyst in a liquid diluent medium, it is necessary to agitate the gas-liquid mixture vigorously, even violently. Adequate agitation is especially difficult to obtain when a quantity of polymer has separated from the liquid, thereby forming a slurry. Furthermore, when these operations are carried out in the usual metal vessels, a coating or deposit of solid material tends to form on the interior surfaces of the apparatus. This coating tends to foul the heat transfer and other surfaces, to impair flow of liquids through pipe lines, and to interfere generally with the intended operation. Such fouling necessitates periodic shut down to clean the apparatus. For these and other reasons, the usual method as just described is disadvantageous.

It is an object of this invention to provide an improved method for polymerizing polymerizable organic materials, especially polymerizable alpha-olefins, such as ethylene, in contact with complex organo-metal catalysts.

A particular object is to provide such a method that facilitates contact of the catalyst and the polymerizable material.

A further object is to provide such a method and means for intimate intermingling of the liquid and gas phases of the reaction mixture.

A further object is to provide such a method whereby a higher concentration of polymer product relative to the liquid diluent can be obtained in the reaction mixture.

A further object is to provide such a method whereby fouling of the heat exchange surfaces of the reactor defining the polymerization reaction zone can be minimized or substantially prevented.

Other objects and advantages of the invention will be evident in the following description.

The objects of this invention have been attained in a method, more particularly described hereinafter, wherein a liquid composition comprising a complex organo-metal catalyst material and an inert liquid diluent is dispersed, e.g. by spraying, into a body of gas comprising a polymerizable organic material, such as a polymerizable alpha-olefin, e.g. ethylene.

The drawing shows, in schematic fashion, an embodiment of apparatus suitable for use in practicing this invention.

In practice of the invention, there is prepared a dispersion of a suitable organo-metal catalyst in an inert liquid diluent. This catalyst composition can be prepared in known manner by admixing a strongly reducing organo-metal compound such as an alkyl aluminum compound and a compound of a heavier metal of group IV–B, V–B, or VI–B of the periodic system of the elements such as titanium or zirconium.

Examples of suitable organo-metal compounds are alkyl aluminum compounds having one of the generic formulae $R_3Al$, $R_2AlH$, $RAlH_2$, $R_2AlX$, and $RAlX_2$, wherein the symbol R represents an alkyl radical, and the symbol X represents a halogen atom, i.e., trialkyl aluminum compounds such as trimethyl aluminum, and triethyl aluminum, tripropyl aluminum, triisobutyl aluminum, and trioctyl aluminum, alkyl aluminum hydrides such as diethyl aluminum hydride and ethyl aluminum dihydride, and alkyl aluminum halides such as diethyl aluminum chloride and ethyl aluminum dichloride. Instead of organo-aluminum compounds there can be used other organo-metal materials such as alkyl zinc or alkyl magnesium compounds.

Examples of suitable compounds of metals of group IV–B, V–B, and VI–B are the halides, oxyhalides, and organic compounds of titanium, zirconium, hafnium, thorium, vanadium, columbium, tantalum, chromium, molybdenum, tungsten and uranium, such as titanium tetrachloride and zirconium acetyl acetonate. Since the complex organo-metal catalyst is prepared by admixing the catalyst-forming starting ingredients in an inert liquid diluent medium, it is preferable that the heavier metal compound be one that is soluble in that diluent liquid, e. g. titanium tetrachloride.

The complex organo-metal catalyst is prepared by admixing one or more of the strongly reducing organo-metal compounds and one or more of the compounds of the group IV–B, V–B, or VI–B metals in the presence of an inert liquid diluent, i. e. a liquid that is chemically inactive with the other ingredients of the composition under the conditions employed in the process and not deleterious to the catalytic activity of the composition, such as one of those hereinbefore mentioned as media for the polymerization. The inert liquid diluent can be either a solvent or a non-solvent for the expected polymeric product.

In general, the number of moles of organo-aluminum compound employed per mole of the compound of a metal of group IV, V, or VI is from 0.1 to 3 or more times the valence of the group IV, V, and VI metal in said compound, e. g. from 0.4 to 12 mole-weights of triisobutyl aluminum per mole-weight of titanium tetrachloride, although larger or smaller proportions can be employed. When the heavier metal compound is a metal acetyl acetonate, the organo-aluminum compound is preferably used in larger proportion, e. g. up to 24 mole-weights or more of triisobutyl aluminum per mole-weight of zirconium acetyl acetonate.

The composition comprising the complex organo-metal catalyst and the inert liquid diluent is then dispersed into a body of gas comprising a polymerizable material, such as ethylene. The dispersion may be effected in any desired manner whereby the liquid comprising the complex organo-metal catalyst is sub-divided into small droplets and distributed into the body of gas. A suitable procedure involves feeding a stream of the catalyst liquid dispersion into the body of gas through a spray nozzle, although other well-known devices for producing a fine-droplet liquid spray can be used.

Because of the small diameters of the resulting liquid droplets and the large ratio of the surface area to the volume thereof, the complex organo-metal catalyst in the liquid droplets readily contacts the polymerizable organic compound contained in the gas in which the catalyst droplets are dispersed. Polymerization of the polymerizable organic compound occurs rapidly under these conditions to form a polymeric product, usually within the dispersed droplets or on their surfaces.

The resulting polymer product can be collected in various ways. Usually, the polymer-containing droplets settle out of the gas body and can be collected at the bottom of the reactor space. While it is advantageous that the droplets of liquid catalyst composition be small, in order to facilitate contact of the catalyst with the polymerizable olefin, it is desirable that the droplets be unstable, i. e. capable of coalescence into a body of liquid, whereby the liquid dispersion of the polymer product can readily be separated from the body of gas.

Control and modification of the process can be effected in many ways. Variation can be made in the kind of catalyst, the kind of inert liquid diluent, the proportion of catalyst to liquid diluent, the size and density of droplets of catalyst material in the body of gas, the kind and concentration of polymerizable organic compound in the body of gas, the pressure of the gas body, and the temperature of the reaction mixture. Temperature control can be effected on the catalyst-liquid dispersion fed to the gas body, on the gas fed to the reactor space, and by indirect heat exchange through the confining walls of the reactor.

The reaction can be carried out within a wide range of temperatures, i. e. from below room temperature to about 250° C., although it is usually preferred to operate between about 50° and 150° C. Any obtainable pressure, from below atmospheric pressure to superatmospheric pressure, can be used. Since very high pressures are not necessary, it is usually preferred to operate between about one and about 100 atmospheres of pressure.

The invention can be visualized by reference to the drawing which shows a diagrammatic sketch of one embodiment of apparatus suitable for carrying out this process. The apparatus comprises a reactor vessel for containing a body of gas comprising a polymerizable organic material, such as ethylene, supplied through a suitable opening from a source not shown. Into the top of the reactor is fed a stream of a liquid composition comprising a complex organo-metal catalyst for the polymerization dispersed in a liquid diluent. The stream of liquid enters the body of gas through a spray nozzle which divides the stream into many very small, but unstable, droplets that are capable of coalescence. The spray pattern is selected so that good distribution of the liquid droplets through the gas body is obtained. Polymerization of the polymerizable organic compound in the gas body takes place on and in the liquid droplets. The liquid droplets and solid particles coalesce and settle out of the gas body and collect at the bottom of the reactor, and are withdrawn as a mixture of polymer, catalyst, and liquid diluent. The polymerization of the polymerizable organic compound, such as ethylene, is usually exothermic. By proper selection of the carrier liquid in the catalyst composition, the heat of reaction can be removed and the temperature of the catalyst-containing droplets can be controlled by vaporization of at least a part of the liquid diluent from the droplets. Such heat can be removed from the system, e. g. by heat transfer surfaces located in the upper portion of the reactor vessel. The drawing portrays a jacket about the upper portion of the reactor for passage of a heat-transfer fluid, such as cooling water. Such an arrangement is advantageous in that condensation of vapors of the liquid diluent takes place on such cooling surfaces in the upper portion of the reaction vessel and the resulting liquid condensate flows downward on the inside surfaces of the reactor walls, thereby continuously washing such walls and preventing the accumulation of solid residues thereon. Furthermore, the spray pattern can be so arranged that such heat transfer surfaces are contacted only by vapors and by liquid condensate and are never exposed to polymer solids. Additional heat transfer can be provided elsewhere in the reactor, e. g. at the bottom as portrayed in the drawing, but this is usually unnecessary.

The mixture of polymer, catalyst, and liquid diluent that is removed from the bottom of the reactor can be treated, e.g. by filtration, to recover the solid polymer therefrom. The mixture of catalyst and liquid diluent can be recycled to the reactor, if necessary adding a further amount of catalyst and liquid diluent to make up losses.

The solid polymer product can be treated in known manner, e.g. by washing with alcohols and/or water, to inactivate and to separate the catalyst residue.

When the starting gas comprising a polymerizable organic compound also comprises a non-polymerizable constituent, a gas stream comprising the non-polymerized constituent can be withdrawn from the reactor through a suitable vent outlet as shown in the drawing.

The invention is not limited to particular apparatus, and arrangements of apparatus other than the one shown can be employed provided that means are supplied for carrying out the procedural steps of the method at the requisite conditions. For example, the locations and number of the various inlet and outlet openings in the reactor can be different from those shown in the drawing. Instead of the liquid spray nozzle shown, there can be used a two-fluid mixing nozzle whereby the liquid catalyst-diluent mixture and the starting gas stream can be fed into the reactor through the same opening with intimate mixing of the atomized liquid droplets and the starting gas stream.

The following example of the polymerization of ethylene illustrates the invention, but should not be construed as limiting its scope.

*Example*

Ethylene was polymerized in a spray-type reactor substantially like that shown schematically in the drawing.

Substantially pure ethylene gas at room temperature was fed into the reactor and was maintained therein at about 90 p.s.i.g.

A catalyst composition was prepared by dispersing triisobutyl aluminum and titanium tetrachloride in liquid n-hexane in amounts corresponding to 3.2 millimoles of triisobutyl aluminum and 4.0 millimoles of titanium tetrachloride per liter of the resulting dispersion. The resulting catalyst dispersion at room temperature was fed at an average rate of 0.58 gallon per minute into the reactor through a spray nozzle.

In order to maintain the gas pressure at about 90 p.s.i.g., the ethylene gas was fed into the reactor at an average rate of 11 pounds per hour. No gas was vented from the reactor.

The temperature inside the reactor was between 71° and 82° C., mostly about 75° C. Water at a temperature of about 35° C. was circulated through the jacket on the upper portion of the reactor only. The pattern of spray of the catalyst composition into the reactor was such that the catalyst did not contact this upper heat exchange surface. Consequently, the upper heat exchange surface remained clean and substantially free of polymer.

From the bottom of the reactor was withdrawn a slurry comprising polymer, catalyst, and n-hexane diluent. This slurry was quenched by admixing with isopropyl alcohol. The polymer solid was collected on a filter, washed with water, and dried.

The polyethylene product was a fluffy white powder. Its molecular weight was about 55,000 as determined by a flow viscosity method.

In place of ethylene, there can be employed another ethylenically unsaturated polymerizable organic material, especially one that contains a vinylidene radical, i.e. the group $CH_2=C<$, and particularly an alpha-olefin, such as propylene, butene-1, isobutylene, styrene, or mixture thereof. In place of the catalyst composition engendered by admixing triisobutyl aluminum and titanium tetrachloride, there can be used another of the complex organo-metal catalyst compositions hereinbefore described. In place of n-hexane, there can be used another chemically inert liquid diluent such as one of those hereinbefore identified.

I claim:

1. A method for making a high molecular weight polymer, which method comprises maintaining in a polymerization reaction zone a body of gas comprising a polymerizable alpha-olefin, feeding into the body of gas a liquid dispersion of a complex organo-metal catalyst, the catalyst having been formed by admixing in an inert liquid diluent an organo-aluminum compound and a heavier metal compound selected from the group consisting of compounds of metals of groups IV–B, V–B, and VI–B of the periodic system, the liquid dispersion being fed in such a manner as to cause subdivision thereof into unstable discrete droplets in the body of gas, maintaining the gas pressure in the reaction zone between about one and about 100 atmospheres and maintaining the average temperature of the reaction mixture between 50° and 150° C., thereby polymerizing a portion of the polymerizable alpha-olefin in the body of gas in contact with such droplets, and coalescing the droplets to obtain a dispersion of polymer in a body of the inert liquid diluent.

2. A method according to claim 1 wherein the polymerizable alpha-olefin is ethylene.

3. A method according to claim 2 wherein the organo-aluminum compound is a trialkyl aluminum compound.

4. A method according to claim 2 wherein the heavier metal compound is a compound of a metal of group IV–B of the periodic system.

5. A method according to claim 2 wherein the heavier metal compound is a compound of titanium.

6. A method according to claim 2 wherein the heavier metal compound is titanium tetrachloride.

7. A method according to claim 2 wherein the catalyst is formed by admixing from 0.4 to 12 mole-weights of a trialkyl aluminum compound and one mole-weight of a compound of titanium.

8. A method according to claim 7 wherein the compound of titanium is titanium tetrachloride.

9. A method for making a high molecular weight polyethylene, which method comprises feeding a gas comprising ethylene into a polymerization reaction zone to provide therein a body of gas comprising ethylene, feeding into that body of gas a liquid dispersion of a complex organo-metal catalyst, the catalyst having been formed by admixing in an inert liquid hydrocarbon diluent from 0.4 to 12 mole-weights of a trialkyl aluminum compound and one mole-weight of a hydrocarbon-soluble titanium compound, the inert liquid hydrocarbon being one that has an appreciable vapor pressure at the temperature prevailing in the reaction zone, the liquid dispersion being fed in such a manner as to cause subdivision thereof into unstable discrete droplets in the body of gas and directed into the body of gas in such a way that the catalyst-containing droplets are substantially prevented from impinging upon an upper portion of the confining wall that defines the reaction zone, cooling such upper portion of the confining wall to effect condensation of vapors of the inert liquid hydrocarbon diluent thereon whereby the resulting liquid condensate is caused to flow downward over the surface of the confining wall of the reaction zone thereby washing accumulated material from said wall, maintaining the gas pressure in the reaction zone between about one and about 100 atmospheres and maintaining the average temperature of the reaction mixture between 50° and 150° C. to effect polymerization of at least a portion of the ethylene in the body of gas in contact with such droplets, coalescing the droplets to obtain a dispersion of polymer in a body of the inert liquid diluent, and separating the polymer from such dispersion.

10. A method according to claim 9 wherein the trialkyl aluminum compound is triisobutyl aluminum and the titanium compound is titanium tetrachloride.

References Cited in the file of this patent

UNITED STATES PATENTS

| Re. 22,210 | De Simo et al. | Oct. 27, 1942 |
| 2,395,079 | Sparks et al. | Feb. 19, 1946 |

FOREIGN PATENTS

| 533,362 | Belgium | May 16, 1955 |